Patented Dec. 7, 1948

2,455,367

UNITED STATES PATENT OFFICE 2,455,367

METHOD FOR DEPOSITING NONREFLECTIVE FILMS AND COMPOSITION THEREFOR

Peter King, Washington, D. C.

No Drawing. Application February 22, 1943,
Serial No. 476,790

8 Claims. (Cl. 117—121)

(Granted under the act of March 3, 1883, as
amended April 30, 1928; 370 O. G. 757)

This invention relates to a method for increasing the transmission of light through transparent solids and reducing the amount of reflection from surfaces of such solids by means of thin films. More particularly the invention is directed to a new method of preparing thin films having non-reflective properties and to compositions involved in their preparation.

It is well known that the presence of a thin film having certain optical characteristics on the surface of a transparent body will increase the transmission of incident light through the body and reduce reflection. The optical characteristics of such a film may be stated as: (1) an index of refraction lower than that of the surface on which it is to be deposited, and (2) a thickness preferably approaching one-fourth wave length of the light in that part of the spectrum which is to be subject to the least reflection, calculated on the velocity of the light in the film. A further desirable characteristic is that the film be porous, to provide better interference between incident and reflected light waves, and hence better cancellation of reflection.

Films having the above characteristics in varying degree (which may be referred to as "non-reflective properties") have generally been made by two methods: (1) bringing the surface to be coated in contact with a mono-molecular layer of the film supported on a liquid, and repeating the operation as many times as needed; and (2) coating the desired surface by sublimation (or evaporation) of certain stable salts, such as calcium or magnesium fluoride, in vacuo. The first method proved to be of little practical importance because the films obtained are extremely delicate and are removed by contact with other things. The second method also yields soft films, but by sacrificing part of the film's "non-reflective" properties it has been possible to produce films on glass (and only on glass) which are better than no film at all and will withstand rough handling.

More recently experimental work has been conducted toward producing non-reflective films from colloidal suspensions of silica in water and also in organic solvents. These experiments have been notably successful insofar as the preparation of highly non-reflective films is concerned, but the films so made suffer from the same defect as those made in the two prior known ways, namely, softness and/or poor adherence. Some progress toward making these silica films more wear resistant was achieved by coating the films with a transparent binder of similar composition after they had dried in place, but the binder sharply reduced the non-reflective properties of the film. Binders found at all suitable for this purpose have consisted of various silicate esters, particularly tetraethyl ortho silicate.

This invention provides a method of depositing thin films characterized by their unusually high non-reflective properties and adherence to surfaces, and resistance to abrasion to a degree unknown heretofore. Also included within the invention are new colloidal suspensions or compositions utilized in the preparation of the films. The method of this invention is not confined to the deposition of such films on glass, but the films may be formed on any clean surface, such as surfaces of cellulose derivatives, synthetic resins and the like. The compositions of the invention from which these films are deposited are further characterized by the fact that surfaces on which the films are to be formed need not be cleaned with any particular care, as the solvents employed are themselves efficient cleaning agents. All that is necessary is to make sure that the surface is free from visible particles of dirt which might cause streaking of the colloidal suspension.

The method of this invention is an improvement of the coating method utilizing colloidal silica suspensions as the film-forming medium, and it is based on the fact that the silica must be deposited in the form of discrete colloidal particles and that these particles must be bonded to the supporting surface or to each other simultaneously with the removal of solvents or other volatile matter. In the methods already described for depositing silica films the silica either was not bonded at all or the binder was applied after formation of the film and so could not be applied with sufficient efficacy to bond the silica without greatly mitigating the non-reflective properties of the film.

In the method of this invention (1) the silica is prepared in the form of an aqueous colloidal suspension, (2) a large part of the water is displaced with one or more selected water-miscible organic solvents and (3) a binder is added in the form of a silicate ester. The amount of water displaced by other solvents is not critical, although best results are obtained if only a small amount of water, or even none, is present in the final colloidal suspension. An extreme amount of water should be avoided in the final suspension so that the silicate ester will remain (at least in part) in the unhydrolyzed condition. The organic solvents must be of the water-miscible type and are characterized by the fact that they can not have more than one hydroxyl group to the molecule. Polyhydroxy alcohols (as well as solvents having multiple polar groups in general) are not suitable because they do not permit the formation of a hard, optically efficient film. In general, water-miscible alcohols, ketones and alcohol-ethers are the preferred solvents for use in this invention.

For the best results a mixture of solvents is employed wherein the least volatile one has a boiling point not exceeding about 200° C. and the range of solvent boiling points is at least about 50° C., preferably selected so that a large difference in boiling points between successive solvents is avoided. For some reason, not yet fully known, the most non-reflective films are obtained when the mixture of solvents is selected so that the evaporation rate from a surface coated with the suspension uniformly decreases as the surface dries (at constant temperature), and this is achieved if the solvents are selected according to their boiling points as indicated above. However, relatively large quantities of solvent are necessary to maintain the silica in suspension and to obtain films of sufficient thickness, with the result that initial evaporation may be fairly rapid.

A typical suspension prepared in accordance with this invention is as follows: An aqueous suspension of colloidal silica is prepared by acidifying a very dilute solution of sodium silicate, the proportions being selected so as to give a suspension of about 3 parts by weight of silica per hundred parts of water. A particularly good suspension of about this composition is available in the market under the name of Aquasol. The bulk of the water is displaced with an organic solvent of higher boiling point, such as "Cellosolve" (ethyl ether of ethylene glycol), by adding the latter to the aqueous suspension and distilling. The water is preferably removed until only about one-tenth of the original amount remains, and the amount of organic solvent may be adjusted to give a composition of about 10% silica, 10% water and about 80% solvent, although these proportions may be varied within wide limits. Referring to this suspension as "composition No. 1" a preferred composition for film deposition is as follows:

| Name | Parts by Volume | Boiling Point |
|---|---|---|
| | | °C. |
| Butyl Cellosolve | 10 | 171 |
| Cellosolve | 46 | 135 |
| Butanol | 25 | 118 |
| Composition No. 1 | 87 | |
| Ethanol | 240 | 78 |
| Ethyl silicate | 10 | |
| Hydrochloric acid (conc.) | 1 | |

The above suspension is most easily applied to small articles by dipping the article to be coated and withdrawing the article at a slow, uniform rate. With large articles it may be applied by spraying. On evaporation of the solvents the film deposited on the article may be additionally hardened by heating for a short period of time (e. g. 15 minutes) at a temperature from 100 to 300° C. Alternatively the suspension may be sprayed on transparent surfaces which have been cleaned with ordinary soap and water, rinsed with fresh water and dried. If the suspension is to be sprayed, it is advisable to dilute it further with alcohol or some similar relatively low boiling solvent. The thickness of the film deposited from the suspension is most easily controlled, in the dipping method, by the concentration of silica in the suspension. This may be varied with rather wide limits. If the film is to be applied by spraying its thickness is obviously controllable by the spraying operation itself. However, care must be taken to avoid obtaining too thick a film, and a quick application with cross-spraying is preferred.

An unusual characteristic of the films deposited from the suspension described in this invention is the fact that they may be deposited equally as well on surfaces other than glass. For example, excellent results have been obtained where the films have been deposited on transparent plastics such as the cellulose derivatives, vinyl resins, methacrylate resins and the like. However, if the film is to be applied to plastics, care should be taken to avoid the use of appreciable amounts of solvents for the plastics in the colloidal suspension, or crazing of the plastic surface may result.

The hydrochloric acid increases the adherence of the films, probably by accelerating the hydrolysis of the ethyl silicate during drying, although the mechanism is not fully known. The amount of acid added is not critical, but at least some acid should be present if the hardest obtainable films are desired. However, fairly hard films of excellent non-reflective properties are obtained without the acid. In place of hydrochloric, any mineral acid may be used, but hydrochloric is preferred because it does not enter complex reactions, is volatile and leaves no residue on evaporation.

Other solvents which may be employed in various proportions in place of those indicated include acetone, isopropyl alcohol, propyl alcohol, dioxane, methanol, Carbitol (ethyl ether of diethylene glycol), methyl carbitol, various alkyl acetates and similar solvents. Various amounts of hexanol and octyl alcohol have been used successfully. Although the solvent mixture preferably should not contain water-immiscible solvents, small amounts of them will do no harm, but large amounts adversely affect the colloidal suspension.

As indicated above, the solvent mixture should preferably be selected so that the boiling points of the individual solvents are spread at least about 50° C. and do not exceed about 200° C. A lower limit of about 60° C. is also preferred inasmuch as solvents boiling much below this are too volatile for proper control of film deposition at room temperature.

To obtain the most preferred composition of this invention it is not necessary to follow rigorously the proportions given in the example, but the formula may be varied within the following approximate limits:

Parts by volume
Butyl Cellosolve _____ 5 to 15
Cellosolve _____ 90 to 130
Butanol _____ 20 to 30
Ethanol _____ 200 to 300
Ethyl silicate _____ 5 to 20
Mineral acid _____ 1 to 5
Water (retained from silica suspension) _ 5 to 10
Colloidal silica, as desired.

The ethyl silicate may be replaced by other silicate esters, but best results are obtained from the use of alkyl silicates.

As already has been stated, the success of this invention over methods previously used for depositing non-reflective films of silica from colloidal suspensions resides in the incorporation of a silicate ester directly in the suspension regardless of any particular solvent combination, although proper choice of the latter increases the durability and non-reflective properties of the films deposited therefrom. With the method described the films obtained may be cleaned with soap and water or wiped with the usual soft cleaning cloths. Grease or oil on the films cancels their non-reflective properties, but a cleansing with soap and water restores the films to full optical power.

Many variations will be apparent to those skilled in the art and the invention should not be limited other than as defined in the appended claims.

The invention described herein may be manufactured and used by or for the Government of the United States of America for governmental purposes without the payment of any royalties thereon or therefor.

I claim:

1. Composition capable of depositing a strong, adherent film having non-reflective properties on a surface, which comprises a colloidal dispersion of silica in a liquid comprising the following materials in approximately the volume proportions given:

|  | Parts |
| --- | --- |
| Butyl Cellosolve | 5 to 15 |
| Cellosolve | 90 to 130 |
| Butanol | 20 to 30 |
| Ethanol | 200 to 300 |
| Ethyl silicate | 5 to 20 |
| Mineral acid | 1 to 5 |
| Water | 5 to 10 |

2. A composition adapted to reduce the light reflectivity of an article treated therewith comprising a relatively stable colloidal suspension of discrete colloidal silica particles in a water miscible, volatile organic solvent selected from the group consisting of alcohols, ketones, alcohol-ethers and mixtures thereof, said solvent comprising more than 80% by volume of the composition, said composition containing minor amounts of an alkyl silicate and mineral acid, with the alkyl silicate being in part at least in an unhydrolyzed condition.

3. A composition adapted to reduce the light reflectivity of an article treated therewith comprising a relatively stable colloidal suspension of discrete colloidal silica particles in a water miscible, volatile organic solvent selected from the group consisting of alcohols, ketones, alcohol-ethers and mixtures thereof, said solvent comprising more than 80% by volume of the composition, said composition containing minor amounts of an alkyl silicate, water and mineral acid, with the alkyl silicate being in part at least in an unhydrolyzed condition.

4. A composition adapted to reduce the light reflectivity of an article treated therewith comprising a relatively stable colloidal suspension of discrete colloidal silica particles in a mixture of water miscible, volatile organic solvents selected from the group consisting of alcohols, ketones, and alcohol-ethers, said solvents comprising more than 80% by volume of the composition, and having boiling points spread over a range of temperatures such that the lowest exceeds 50° C. and the highest is less than 200° C., said composition containing minor amounts of an alkyl silicate, with the alkyl silicate being in part at least in an unhydrolyzed condition.

5. The method of forming a strong adherent film having non-reflective properties on a given surface comprising the application and evaporation upon said surface of a colloidal suspension of discrete colloidal silica particles dispersed in a water miscible volatile organic solvent selected from the group consisting of alcohols, ketones, alcohol-ethers and mixtures thereof, the solvent comprising more than 80% by volume of the suspension, said suspension containing minor amounts of an alkyl silicate, water and mineral acid, the alkyl silicate being in part at least in an unhydrolyzed condition.

6. The method of depositing on a surface a strong adherent coating having low light reflecting properties which comprises preparing a colloidal dispersion of discrete colloidal particles of silica, incorporating said colloidal dispersion in a water miscible volatile organic solvent selected from the group consisting of alcohols, ketones, alcohol-ethers and mixtures thereof, the solvent comprising more than 80% by volume of the resultant dispersion, and adding thereto amounts of alkyl silicate and mineral acid while maintaining the alkyl silicate in part at least in an unhydrolyzed condition in the dispersion, applying said resulting mixture to the acid surface and allowing the solvent to evaporate whereby a coating having low reflection characteristics results.

7. The method of depositing on a surface a strong adherent coating having low light reflecting properties which comprises preparing a colloidal dispersion of discrete colloidal particles of silica in water, incorporating said colloidal dispersion in a mixture of water miscible volatile organic solvents selected from the group consisting of alcohols, ketones and alcohol-ethers, with the solvents comprising more than 80% by volume of the resultant dispersion and being so selected that their boiling points are spread over a temperature range of approximately from 50° C. to 200° C., and adding thereto controlled amounts of alkyl silicate, controlling the proportions of water, organic solvents and alkyl silicate so as to maintain the alkyl silicate in part at least in an unhydrolyzed condition in the dispersion, applying said dispersion to the surface, and allowing the solvents to evaporate whereby a coating having low reflection characteristics results.

8. The method of depositing on a given surface a strong adherent coating having low light reflection characteristics which comprises preparing a colloidal suspension of discrete colloidal silica particles in an aqueous suspension, replacing the water in said aqueous suspension with at least one water miscible volatile organic solvent selected from the group consisting of alcohols, ketones and alcohol-ethers in sufficient quantity that the solvent comprises more than 80% by volume of the resultant dispersion, and adding thereto amounts of alkyl silicate and mineral acid with the alkyl silicate being held in part at least in an unhydrolyzed condition when in the mixture, and applying said resultant mixture to the said surface, and allowing the solvent to evaporate whereby a coating having low reflection characteristics results.

PETER KING.

REFERENCES CITED

The following references are of record in the file of this patent:

UNITED STATES PATENTS

| Number | Name | Date |
| --- | --- | --- |
| 1,809,755 | King | June 9, 1931 |
| 2,347,733 | Christensen | May 2, 1944 |
| 2,356,553 | Weissenberg | Aug. 22, 1944 |
| 2,366,516 | Geffcken | Jan. 2, 1945 |